(12) United States Patent
Scarlatti et al.

(10) Patent No.: US 8,855,016 B2
(45) Date of Patent: Oct. 7, 2014

(54) METHOD FOR MAINTAINING LINKS IN A MOBILE AD HOC NETWORK

(75) Inventors: David Scarlatti, Madrid (ES); Roberto Molina, Madrid (ES); Nicolas Pena Ortiz, Seville (ES); Anibal Ollero, Seville (ES); Carlos Montes Relanzon, Las Rozas de Madrid (ES)

(73) Assignee: The Boeing Company, Chicago, IL (US)

( * ) Notice: Subject to any disclaimer, the term of this patent is extended or adjusted under 35 U.S.C. 154(b) by 665 days.

(21) Appl. No.: 12/730,864

(22) Filed: Mar. 24, 2010

(65) Prior Publication Data

US 2010/0246445 A1 Sep. 30, 2010

(30) Foreign Application Priority Data

Mar. 30, 2009 (EP) .................................. 09382039

(51) Int. Cl.
| | | |
|---|---|---|
| *H04L 12/28* | (2006.01) | |
| *H04B 7/185* | (2006.01) | |
| *H04L 12/703* | (2013.01) | |
| *H04L 12/721* | (2013.01) | |
| *H04W 40/24* | (2009.01) | |
| *H04J 1/16* | (2006.01) | |
| *H04W 40/20* | (2009.01) | |
| *H04W 84/06* | (2009.01) | |

(52) U.S. Cl.
CPC ............ *H04B 7/18508* (2013.01); *H04W 40/20* (2013.01); *H04W 84/06* (2013.01); *H04L 45/28* (2013.01); *H04L 45/123* (2013.01); *H04W 40/248* (2013.01)
USPC ............ 370/255; 370/252; 370/329; 370/386

(58) Field of Classification Search
USPC .................................. 370/255, 252, 329, 386
See application file for complete search history.

(56) References Cited

U.S. PATENT DOCUMENTS 6,304,556 B1 * 10/2001 Haas .............................. 370/254
6,816,460 B1    11/2004 Ahmed et al.
(Continued)

FOREIGN PATENT DOCUMENTS

EP    1 134 939 A1    9/2001
EP    1 964 318        6/2007
(Continued)

OTHER PUBLICATIONS

European Search Report received in corresponding European Patent Application No. EP09382038 from the European Patent Office (EPO) mailed Jul. 30, 2009, reference NAMM/NPT/P.

(Continued)

*Primary Examiner* — John Pezzlo
(74) *Attorney, Agent, or Firm* — Toler Law Group, PC

(57) ABSTRACT

The present disclosure relates to mobile ad hoc networks, and to ad hoc networks using aircraft in particular. A method of maintaining data links to and from a source node in an ad hoc mobile network is provided. The network comprises nodes including neighbor nodes corresponding to nodes within range for direct communication with the source node. The neighbor nodes comprise active neighbor nodes and inactive neighbor nodes, the active neighbor nodes being connected to the source node via respective active data links and the inactive neighbor nodes having respective inactive data links to the source node. One or more lost neighbor nodes are identified and revised configurations of data links are considered that account for the change in neighbor nodes. A new configuration is selected based at least partly on the cost of sending messages from the source node using the revised configurations.

13 Claims, 13 Drawing Sheets

(56) References Cited

U.S. PATENT DOCUMENTS

| | | |
|---|---|---|
| 7,212,492 B1 * | 5/2007 | Au et al. .................. 370/229 |
| 7,664,043 B1 * | 2/2010 | D'Souza et al. ............ 370/242 |
| 2003/0112463 A1 * | 6/2003 | Kimoto .................... 358/1.15 |
| 2005/0111428 A1 | 5/2005 | Orlik et al. |
| 2006/0183423 A1 * | 8/2006 | Johansson et al. ......... 455/41.2 |
| 2007/0115829 A1 | 5/2007 | Strutt et al. |
| 2007/0177511 A1 * | 8/2007 | Das et al. ................. 370/238 |
| 2007/0189191 A1 | 8/2007 | Ades |
| 2007/0206547 A1 | 9/2007 | Gong et al. |
| 2007/0274232 A1 * | 11/2007 | Axelsson et al. ........... 370/254 |
| 2008/0031155 A1 | 2/2008 | Korus et al. |
| 2008/0170518 A1 * | 7/2008 | Duggi et al. ............... 370/310 |
| 2008/0310376 A1 * | 12/2008 | Ban et al. .................. 370/338 |
| 2009/0046678 A1 | 2/2009 | Lee et al. |
| 2009/0135824 A1 * | 5/2009 | Liu ............................ 370/392 |
| 2009/0262642 A1 | 10/2009 | van Greunen et al. |
| 2010/0091823 A1 * | 4/2010 | Retana et al. ............... 375/211 |
| 2011/0164527 A1 | 7/2011 | Mishra et al. |
| 2012/0002536 A1 | 1/2012 | Bellur et al. |

FOREIGN PATENT DOCUMENTS

| | | |
|---|---|---|
| EP | 1 912 392 A2 | 4/2008 |
| WO | WO 2007/053141 A1 | 5/2007 |
| WO | WO 2007/059560 | 5/2007 |

OTHER PUBLICATIONS

Nakagawa, H., et al. "A Hybrid Greedy Routing with Location Information for Mobile Ad Hoc Networks," IEICE Transactions on Communications, Communications Society, Sep. 1, 2008.

Sakhee, E., et al. "Aeronautical ad hoc Networks," Wireless Communications and Networking Conference, 2006, WCNC 2006, IE EE Las Vegas, Nevada, USA, Apr. 2006, Piscatawa, NJ.

Shih-Lin Wu, et al. "Route Maintenance in a Wireless Mobile ad hoc Network," Systems Science, 2000, Proceedings of 33rd Annual Hawaii International Conference, Jan. 4, 2000.

Extended European Search Report received in European Patent Application No. EP09382039.7-1249 from the European Patent Office (EPO), mailed Jul. 24, 2009; Reference: NAMM/NPT/P.

Sakhaee et al., "The Global In-Flight Internet", IEEE Journal on Selected Areas in Communications, vol. 24, No. 9; Sep. 2006.

* cited by examiner

| destination node address | best neighbor node and score | next best neighbor node and score | next best neighbor node and score | ... |
|---|---|---|---|---|
| n2 | n2  0 | n3  56 | n4  121 | ... |
| n3 | n3  0 | n2  49 | n4  109 | ... |
| ⋮ | ⋮ | ⋮ | ⋮ | ⋮ |
| n49 | n5  154 | n4  257 | n2  298 | ... |
| ⋮ | ⋮ | ⋮ | ⋮ | ⋮ |

*FIG. 8*

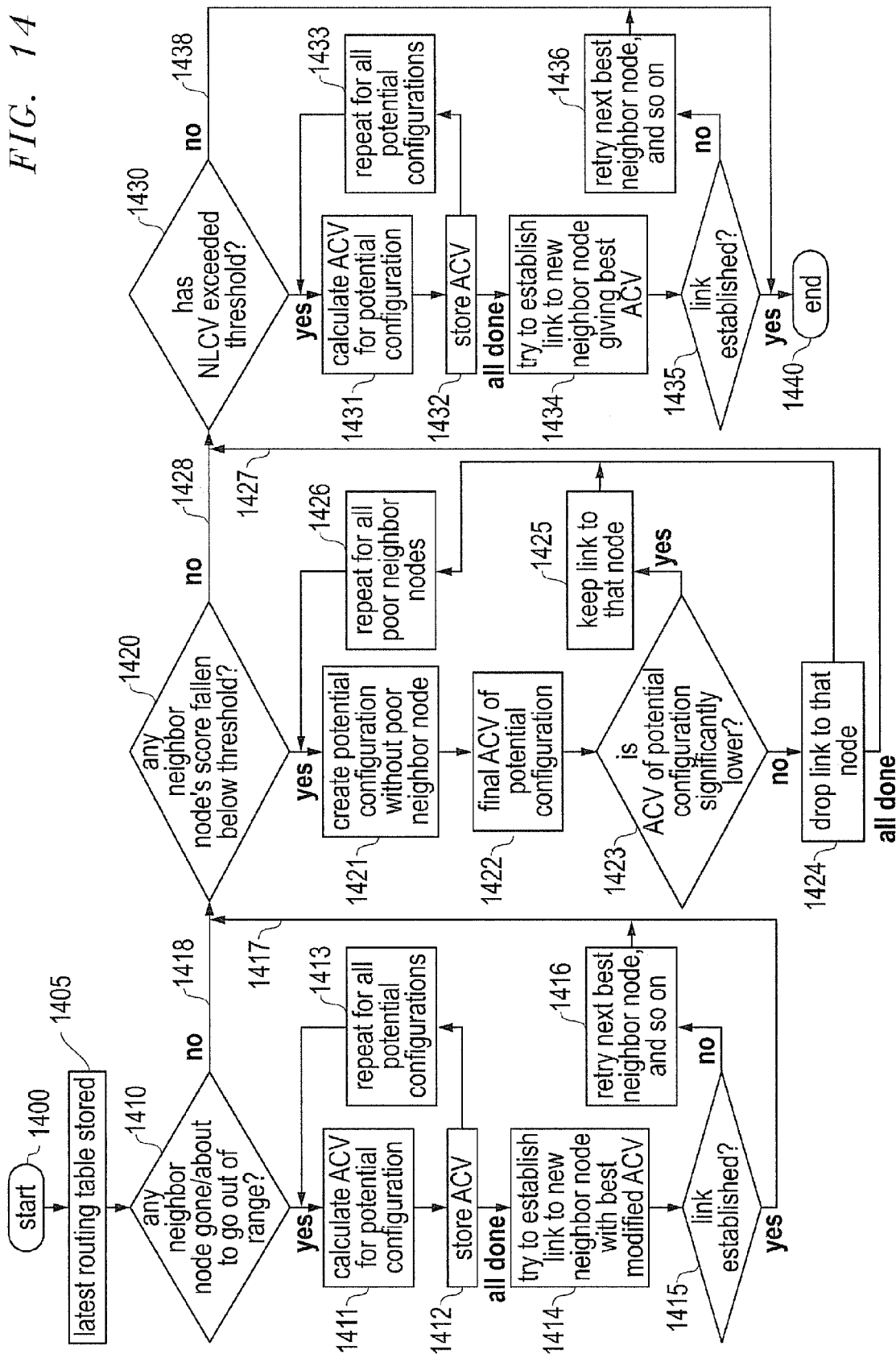

METHOD FOR MAINTAINING LINKS IN A MOBILE AD HOC NETWORK

CROSS REFERENCE TO RELATED APPLICATIONS

This application is related to co-pending U.S. patent application Ser. No. TBD, filed TBD, entitled "Method for Routing in a Mobile Ad Hoc Network", which is incorporated by reference in its entirety.

This application claims the benefit of priority from EP Patent Application No. 09382039.7, filed on Mar. 30, 2009, in the Spanish Patent Office, the disclosure of which is incorporated herein in its entirety by reference.

FIELD OF THE INVENTION

The present disclosure relates to mobile ad hoc networks, and to ad hoc networks using aircraft in particular. Embodiments of the invention relate to maintaining a configuration of active and inactive links to and from a source node in the ad hoc network to its neighbour nodes.

BACKGROUND

Ad hoc networks are well known. They comprise a number of nodes corresponding to individual transmitter/receivers. For any node, there will be some nearby nodes that are in range for direct communication, and these are referred to as neighbour nodes. Other nodes will be out of range for direct communication and so may only be contacted indirectly with multiple hops via intermediate nodes. The ad hoc nature of the network means that, for any particular message, they may be many possible routes through different intermediate nodes that connect a source node with a destination node. Directing a message along a particular route requires a comparison of the routes available to select the best available. To this end, costs may be associated with any particular route based on, for example, the number of hops between nodes, the length of each hop, the speed of a node, etc. Algorithms for determining the relative costs of available routes are well known, the Dijkstra algorithm being an example.

Mobile ad hoc networks that use mobile nodes are known, and have been proposed using automobiles or aircraft as nodes (usually in combination with some fixed nodes such as base stations or ground stations). An example of an automobile ad hoc network may be found in EP-A-1,964,318. An example of an aircraft ad hoc network may be found in WO2007/059560. As the nodes are mobile and fast-moving by their very nature, the network has to be reconfigured on an ongoing basis to reflect the fact that respective pairs of nodes will move into and then out of range for direct communication with each other.

Implementing such an ad hoc network for aircraft has a particular problem in that the relative speed of aircraft may be so high. This has an adverse impact on the possible duration of a direct communication link between two nodes, particularly where the nodes correspond to a pair of aircraft flying in opposite directions.

The present disclosure is concerned with maintaining a configuration of active and inactive links to and from a source node to its neighbour nodes in a mobile ad hoc network. Ad hoc networks using aircraft are of particular concern.

SUMMARY

Against this background, a first embodiment of the invention discloses a method of maintaining data links to and from a source node in an ad hoc mobile network. The network comprises nodes including neighbour nodes corresponding to nodes within range for direct communication with the source node. The neighbour nodes comprise active neighbour nodes and inactive neighbour nodes, the active neighbour nodes being connected to the source node via respective active data links and the inactive neighbour nodes having respective inactive data links to the source node, the active and inactive data links forming an existing configuration of data links. An inactive data link may be a previously active link that has gone inactive, and may be a link that has never been active. In this latter sense, an "inactive link" may be merely notional, i.e. a link that could exist but does not.

The method comprises the following. (1) Identifying one or more lost neighbour nodes corresponding to neighbour nodes of the existing configuration that have moved out of range for direct communication with the source node and/or are about to move out of range for direct communication. (2) Determining revised configurations of data links in which any active links to lost neighbour nodes are considered inactive and, for at least one revised configuration, an inactive link is considered active and/or a further active link is considered inactive. (3) Determining an overall configuration value for each revised configuration based at least partly on the cost of sending messages from the source node using the revised configuration of data links. (4) Selecting a new configuration of data links from the revised configurations according to the overall configuration values determined. (5) Forming the new configuration of data links by breaking data links with neighbour nodes that are active on the existing configuration list but inactive on the new configuration list, and forming data links with any neighbour nodes that are inactive on the existing configuration list and active on the new configuration list.

Advantageously, data links are only maintained to a subset of neighbour nodes. This may be advantageous because of hardware limitations, e.g. an aircraft may have a limited number of channels that it may support. The configuration of links may be reconfigured when a neighbour node goes out of range for direct communication or when a new neighbour node comes into range for direct communication. The new configuration of active and inactive links may be selected based on the costs of routes through the neighbour nodes thereby favouring the formation of links with neighbour nodes providing low costs.

Step (1) may be implemented such that only active neighbour nodes that have moved/are about to move out of range are identified.

Embodiments of the invention may be implemented such that one or more lost neighbour nodes that have moved out of range for direct communication with the source node are identified. In this case, the active links will already have become inactive, by definition as direct communication is no longer possible. Thus, step (5) requires no active breaking of links to the lost neighbour nodes as this will occur automatically. All such lost neighbour nodes may be identified.

Alternatively, embodiments of the invention may be implemented such that one or more lost neighbour nodes that are about to move out of range for direct communication are identified. In this case, breaking links to those lost neighbour nodes becomes active, i.e. the links are made inactive before they go out of range for direct contact. All such lost neighbour nodes may be identified.

A combination of the above methods may be used. i.e. when predicting that neighbour nodes are about to go out of contact, a check may be made for any neighbour nodes that are unexpectedly already out of range for direct contact.

Optionally, the method further comprises identifying new neighbour nodes that have moved into range for direct communication with the source node or are about to move into range for direct communication. Step (2) may then optionally include determining at least one revised configuration in which an active link to a new neighbour node is considered.

Step (2) may comprise determining revised configurations in all of which any active data links to lost neighbour nodes are considered inactive. Optionally, one revised configuration has no further links changed from active to inactive or vice versa. A further revised configuration may optionally be determined for each inactive link in which that inactive link is considered active. Moreover, revised configurations may be determined where any active data links to lost neighbour nodes are considered inactive and two or more further links are changed from active to inactive or vice versa. These methods see revised configurations determined that have varying arrangements of active and inactive links. The overall configuration value is then determined for each revised configuration and the best configuration may be implemented as the new configuration.

Various methods of generating revised configurations may be followed, such as random or targeted. For example, revised configurations may be determined that preferentially make inactive links to active neighbour nodes that are poor performers and/or preferentially make active links to inactive neighbour nodes that appear to be good performers. The performance of any neighbour node may be determined by reference to the traffic it sees. For example, points may be assigned to a neighbour node according to the messages it is sent. The points may reflect the cost associated with the neighbour node for forwarding the message and/or the priority of the message sent.

Step (3) may comprise determining the best cost of sending messages from the source node to their respective destination nodes, and attributing points to the overall configuration value in accordance with the best costs. Optionally, the method comprises attributing points to the overall configuration value in accordance with both the best costs and the priority of each message.

Optionally, step (3) comprises attributing points to the overall configuration value by considering the messages sent by the source node during a prior period, such as during an immediately prior period of say the previous five seconds. This may apply to messages both originating from the source node and also received by and subsequently forwarded by the source node. Thus the messages sent in a prior period may be looked at in the context of sending them with the revised configuration and the resulting points given to the overall configuration value calculated. This may require reference to the routing tables covering the prior period, as well as the configuration of neighbour nodes during the same prior period. For example, a record may be kept for each possible destination node of messages sent to that node during the prior period. Each time a message is sent, this may be added to the record of the destination node (optionally, along with an indication of priority). Old messages are deleted from the records after their age exceeds the length of the prior period. The points of the overall configuration value may be calculated from these records.

Selecting the new configuration in step (4) may comprise selecting the revised configuration with the best overall configuration value.

Optionally, if a message cannot be sent from the source node because a required neighbour node is an inactive neighbour node, the method may further comprise the following. (i) Determining revised configurations of data links in which an inactive link is considered active and/or an active link is considered inactive. (ii) Determining an overall configuration value for each revised configuration based at least partly on the cost of sending messages from the source node using the revised configuration of data links. (iii) Selecting a new configuration of data links from the revised configurations according to the overall configuration values determined. (iv) Forming the new configuration of data links by breaking data links with neighbour nodes that are active on the existing configuration list but inactive on the new configuration list, and forming data links with any neighbour nodes that are inactive on the existing configuration list and active on the new configuration list.

Thus, the method may adapt to messages that may in theory be sent but are prevented from being sent because a necessary link to a neighbour node is inactive. When such a situation occurs, a reconfiguration results. Optionally, step (i) comprises determining revised configurations of data links in all of which the inactive link to the required neighbour node is considered active. This guarantees that the new configuration will allow delivery of the message. Where more than a single neighbour node could be used to send the message, the method may ensure that at least one of these neighbour nodes is considered active in all of the revised configurations.

In an alternative embodiment, a reconfiguration is not performed every time a message cannot be delivered due to a required neighbour node being inactive. Instead such messages are queued, for example in a buffer. The buffer is checked and a reconfiguration may be triggered depending on the contents of the buffer.

For example, if a message cannot be sent from the source node because a required neighbour node is an inactive neighbour node, the method may further comprise the following. (a) Putting the message into a queue and increasing a queue score. (b) Determining when the queue score exceeds a threshold. When the threshold is exceeded, (c) determining revised configurations of data links in which an inactive link is considered active and/or an active link is considered inactive. (d) Determining an overall configuration value for each revised configuration based at least partly on the cost of sending messages from the source node using the revised configuration of data links. (e) Selecting a new configuration of data links from the revised configurations according to the overall configuration values determined. (f) Forming the new configuration of data links by breaking data links with neighbour nodes that are active on the existing configuration list but inactive on the new configuration list, and forming data links with any neighbour nodes that are inactive on the existing configuration list and active on the new configuration list.

Optionally, the method further comprises determining whether any of the messages currently stored in the queue may be sent as a required inactive neighbour node is now an active neighbour node according to the new configuration, and sending any such queued messages. The queue score may be decreased whenever a queued message is sent.

Each neighbour node may have an associated neighbour node score. The method may further comprise assigning points to neighbour node scores according to the traffic that neighbour node sees. Optionally, if a neighbour node score falls below threshold, the method may further comprise the following. (A) Determining revised configurations of data links in which an inactive link is considered active and/or an active link is considered inactive. (B) Determining an overall configuration value for each revised configuration based at least partly on the cost of sending messages from the source node using the revised configuration of data links. (C) Selecting a new configuration of data links from the revised configurations according to the overall configuration values determined. (D) Forming the new configuration of data links by breaking data links with neighbour nodes that are active on the existing configuration list but inactive on the new configuration list, and forming data links with any neighbour nodes that are inactive on the existing configuration list and active on the new configuration list.

The points assigned to the neighbour node scores may be scaled according to the priority of each message that neighbour node sees. Optionally, the method further comprises assigning points to the neighbour node scores for each message sent according to the cost of sending that message through that neighbour node.

Any of the above methods may be implemented in the context of an ad hoc network that uses aircraft as some, or all, nodes.

BRIEF DESCRIPTION OF THE DRAWINGS

In order that the present disclosure may be more readily understood, preferred embodiments will now be described, by way of example only, with reference to the accompanying drawings in which:

FIG. 8 illustrates a routing table;

FIG. 14 is a schematic representation of an alternative method of maintaining links in an ad hoc network in an embodiment of the invention.

DETAILED DESCRIPTION

An ad hoc network is described below to provide a context for the present disclosure. Details more closely related to embodiments of the invention claimed herein follow.

Overview of Network

Figure 1:
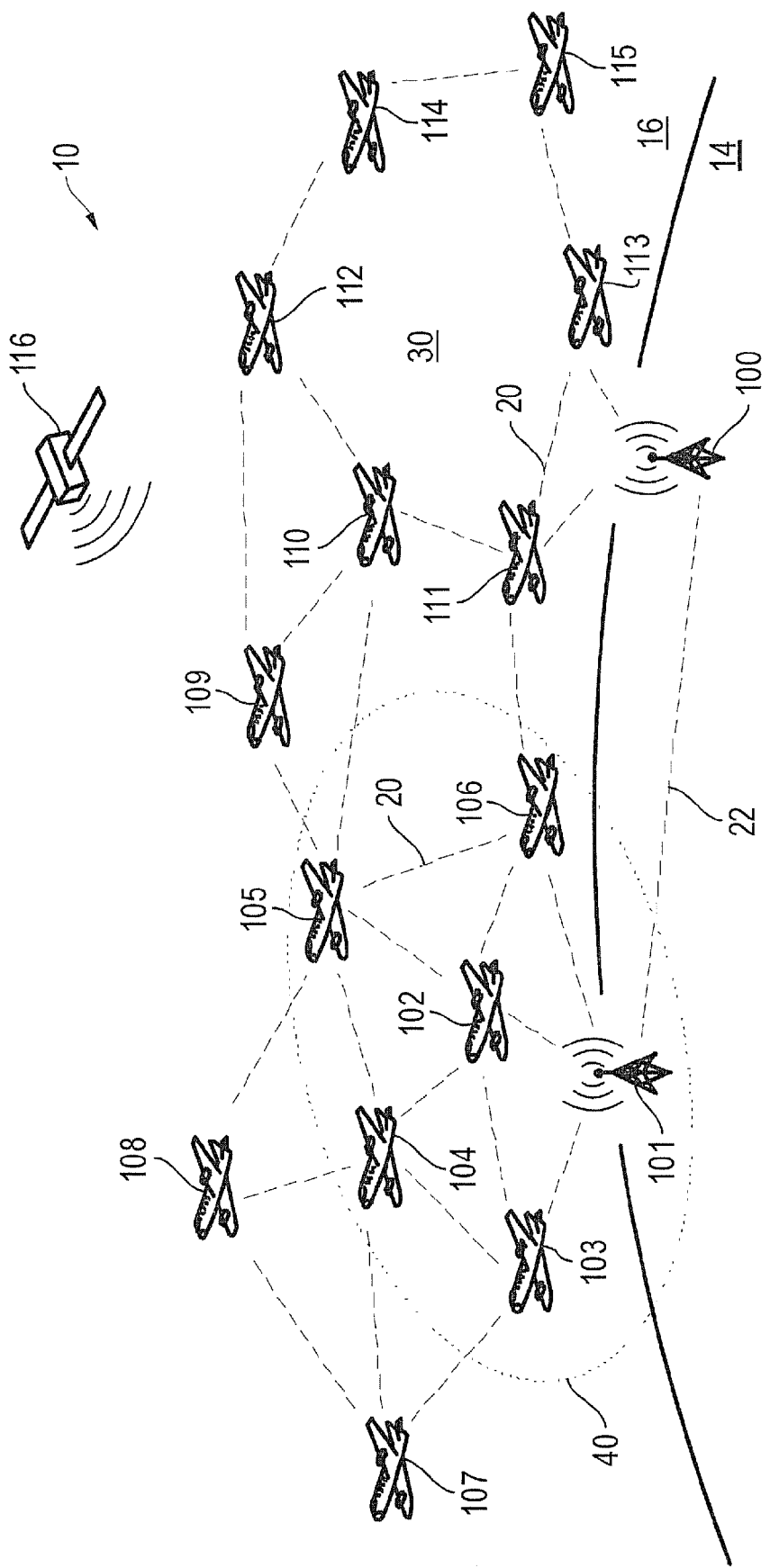
FIG. 1 is a schematic showing an ad hoc network including aircraft in one embodiment of the invention.

A snapshot of an ad hoc network 10 is shown in FIG. 1. The network has nodes 100-115 corresponding to many aircraft 102-115 and a pair of ground stations 100-101. The ground is indicated at 14, and the sky is indicated at 16. The ad hoc network 10 may also comprise one or more satellites, such as satellite 116. The number of aircraft nodes 102-115, ground stations 100-101 and satellites 116 may vary and the total shown in FIG. 1, and their arrangement, is arbitrary. Direct communication is possible between certain pairs of nodes 100-115 as indicated by the dashed lines 20. Whether a pair of nodes 100-115 can form a direct link 20 is determined by the ranges of the nodes 100-115. In more sophisticated embodiments, further information is considered when determining whether a pair of nodes 100-115 can form a direct link 20. For example, the effects of the prevailing weather and altitudes of one or both the nodes 100-115 may be taken into account as they may alter the distance over which a direct link may be maintained. In general, all pairs of ground stations 100-101 may be treated as having a direct link 20, like that shown at 22, that may be provided by a telecommunications network or the like. In this embodiment, satellites 116 are used to transmit information only and do not receive information from other nodes 100-115. Other embodiments are contemplated where one or more satellites 106 may transmit and receive messages to and from the other nodes 100-115, and so become "fully functioning" nodes of the network 10. For the purposes of the following description, the satellite 116 is not considered a node 100-115, unless specifically mentioned as such.

The nodes 100-115 form a mesh covering the ad hoc network 10. Certain parts of the mesh will be well populated with nodes 100-115, such as the area around aircraft 102 and 104. Other parts of the mesh will be sparsely populated with nodes 100-115, forming holes in the mesh such as the one shown at 30.

A message may travel between any pair of nodes 100-115, either directly or via other nodes 100-115 where a direct link 20 is not available. Each node 100-115 treats an outgoing message in the same way, irrespective of whether the message originates from that node 100-115 or whether the message was received for forwarding. Hence, a message is likely to pass through a number of nodes 100-115, each of which will act in the same manner as they forward the message. Hence, effectively, each node 100-115 forwarding the message becomes a source node for the next hop of the message's route.

To illustrate the present disclosure, an embodiment of an aircraft 102-115 will be discussed in more detail. The aircraft chosen is aircraft 102, and so will be the source node 102 in the following description. As all of the aircraft 102-115 are broadly similar, the choice of aircraft 102 is arbitrary. The following describes the aircraft 102-115 itself, as well as the methods it performs in connection with the present disclosure. These methods will be practised by the other nodes 100-115 in the network 10.

In the snapshot of FIG. 1, a limited number of nodes 101-106 may communicate directly with aircraft 102. These nodes are ground node 101 and aircraft nodes 103-106. These five nodes 101-106 are shown within dashed oval 40 that approximately illustrates the communication range of aircraft 102 (whether or not a direct link 20 may be formed also depends on the range of the other node 101-106). Each of these nodes 101-106 represents a neighbour node 101-106 to source node 102, i.e. a node 101-106 capable of direct communication with source node 102.

Figure 2:
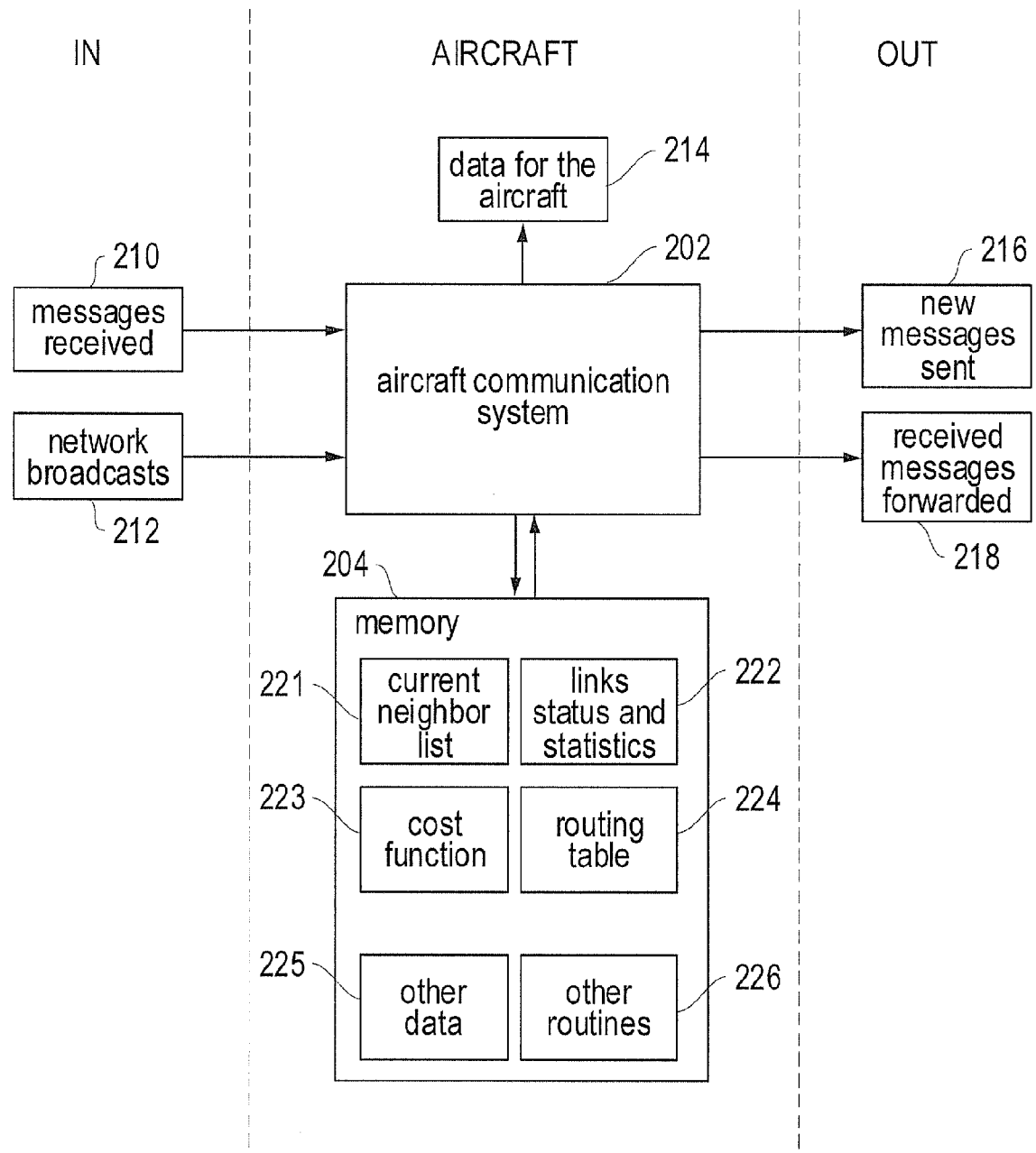
FIG. 2 is a schematic showing the data flow into and out from an aircraft communication system configured for use with an embodiment of the invention.

Source node 102 performs at least two functions independently, namely compiling a routing table 224 (as shown in FIG. 2) reflecting the current positions of the nodes 101-115 of the ad hoc network 10 and determining the best neighbour node 101-106 to send a message for forwarding to a particular destination node 100-115. The first function is performed periodically whenever the current positions of the nodes 100-115 are updated, and the second function may be performed on demand (whenever a message needs to be sent) by reference to the current routing table 224.

The source node 102 may also perform a third, optional function. As will be described in more detail below, the source node 102 may maintain a limited number of links 20 to neighbour nodes 101-106 as active and leave a number of links 20 to neighbour nodes 101-106 as inactive. Maintaining these links 20 includes reconfiguring the links 20 in response to changes in the position of the nodes 100-115 in the network 10. This function will be described in more detail later. For the time being, this function will not be considered. Instead, the source node 102 is assumed to form an active link to a neighbour node 101-106 whenever a message is to be sent to that neighbour node 101-106.

In this embodiment, aircraft node 114 will be treated as the destination node 114 for a particular message, although the choice of aircraft 114 is arbitrary. The message may either originate from source node 102, or it may have been received by source node 102, say from node 103, for forwarding to destination node 114. As destination node 114 is out of range for direct communication, source node 102 must instead determine to which neighbour node 101-106 the message is to be sent. According to an embodiment of the present invention, source node 102 determines to which neighbour node 101-106 the message is to be sent for forwarding without determining the remainder of the route to the destination node 114. To do this, the source node 102 consults the current routing table 224 to determine the best neighbour node 101-106. Compilation of the routing table 224 is performed independently of determining the routing of any particular message. To compile the routing table 224, the source node 102 must have knowledge of the nodes 101-115 forming the ad hoc network 10, and this information is provided in network broadcasts 212.

Data Flow in and Through an Aircraft Node

The aircraft 102 itself needs little, if anything, in the way of hardware modification. As will be appreciated, modern aircraft are capable of bi-directional data transmission, to and from ground stations 100-101, other aircraft 102-115 and satellites 116. These communication facilities may be used to implement embodiments of the present invention, for example antennas/aerials, processors, etc. A processor may be programmed to implement the various embodiments, i.e. a computer of the aircraft 102 may be configured to operate a computer program in one embodiment. Alternatively, a dedicated computer may be provided to implement an embodiment of the present invention.

FIG. 2 shows an aircraft communication system 202 of aircraft 102 in schematic form. The aircraft communication system 202 may comprise a computer, antenna and other hardware necessary to send, receive and process messages. A memory 204 of the aircraft communication system 202 is shown separately. FIG. 2 also shows the data flow into and out from the aircraft communication system 202.

The data flow into the aircraft communication system 202 includes messages 210 and network broadcasts 212 received by the aircraft 102, directly from ground stations 100-101 and satellites 116, or indirectly via other aircraft 103-115.

Network broadcasts 212 may be transmitted by ground stations 100-101 and/or satellites 116, and contain information about the ad hoc network 10. In this embodiment, the network broadcast 212 contains a list of all the nodes 100-115 in the network 10, the current position of each node 100-115, the current velocity of each node 100-115, the communication range of each node 100-115 and a time stamp. This information is used by the aircraft communication system 202, and at least some of the information is stored in the memory 204. The reasons for including all this information will become apparent from the description below. As shown in FIG. 1, aircraft 102 may receive a network broadcast 212 directly from ground station 101. For some aircraft, like aircraft 109, a network broadcast 212 must be relayed via one or more nodes like aircraft 110 and 111.

Incoming messages 210 will contain addressing information. If the addressing information indicates that aircraft 102 is the destination node for that message, the aircraft communication system 202 processes the message and passes the associated data to the relevant part of the aircraft 102, as indicated at 214. If the addressing information indicates that the message 210 is to be forwarded elsewhere, the aircraft communication system 202 processes the message by determining to which of its neighbour nodes 101-106 it will send the message. This is performed in the same way as for messages originating from the aircraft 102.

The aircraft communication system 202 also transmits messages 216 and 218. FIG. 2 shows new messages 216 originating from the aircraft 102 separately to forwarded messages 218 originating elsewhere, although the choice of neighbour node 101-106 and transmission of the messages 216 and 218 may be handled in the same way irrespective of the origin of a message.

FIG. 2 shows some of the memory blocks 221-226 of the memory 204. These memory blocks 221-226 supply data and routines to the aircraft communication system 202, as will be described in more detail below. Some of these blocks are shown generically as "other data 225" and "other routines 226", while others 221-224 are shown individually.

Background to Routing

Figure 3:
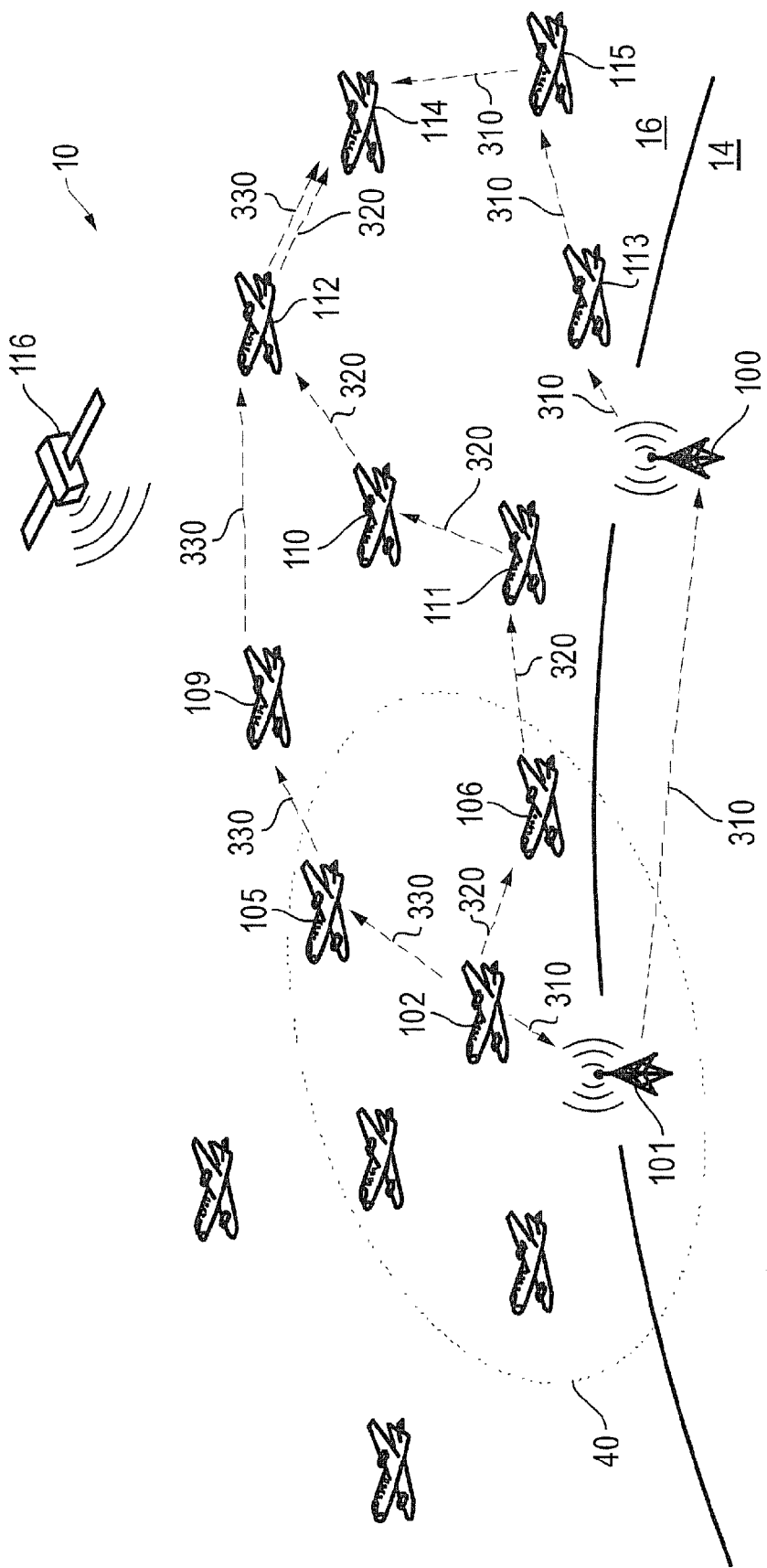
FIG. 3 is a schematic adapted from FIG. 1 and shows three possible routes a message may take during transmission from a source node to a destination node.

FIG. 3 shows a hypothetical situation where aircraft 102 is the source node 102 for a message to be sent to destination node 114. As no direct link exists between source node 102 and destination node 114, the message must be routed through a number of other nodes 100-115. As will be appreciated, many different routes may be possible. FIG. 3 shows three such possible routes. A first route, shown as a dot-dash line at 310, sees the message routed via ground station 101, ground station 100, aircraft 113 and aircraft 115 before reaching destination node 114. A second route, shown as long dash line 320, sees the message routed via aircraft 106, aircraft 111, aircraft 110 and aircraft 112 before reaching destination node 114. A third route, shown as short dash line 330, sees the message routed via aircraft 105, aircraft 109 and aircraft 112 before reaching destination node 114.

Each of the three routes shown 310-330 start by being routed through different neighbour nodes 101, 105 and 106. Also, the different routes 310-330 have different merits. For example, route 330 has the least number of nodes 100-115 and hence hops between nodes 100-115. Route 310 includes a hop between ground stations 101 and 100 which will typically offer a fast and reliable communication link.

According to the prior art, whenever a request to send a message is generated, the aircraft 102 must determine how to send the message. To do this, costs are associated with nodes 100-115 and/or links between nodes 100-115. The source node 102 would use a well-known algorithm such as a Dijkstra algorithm to calculate the total cost of each possible route to the destination node 114. The route with the most promising cost would then be chosen. However, such an approach requires a lengthy calculation to be made each and every time a message is to be sent. Moreover, the dynamic nature of the network 10 means that it is often impractical to store previously-used routes for use the next time a message is sent to the same destination node 114.

Instead of following such an approach, a method is proposed that separates the routing calculations from determining where to send any particular message. While the routing calculations used to compile the routing table 224 make use of the positions of all network nodes 100-115, a request to send a message merely results in a reference to the routing table 224 to determine which neighbour node 101-106 is to forward the message: the complete route for any particular message is not determined. The neighbour node 101-106 that receives the message then replicates the method performed at the source node 102, and so on until the message reaches its destination node 114. At each node 100-115, only the best neighbour node 101-106 is determined.

Figure 4:
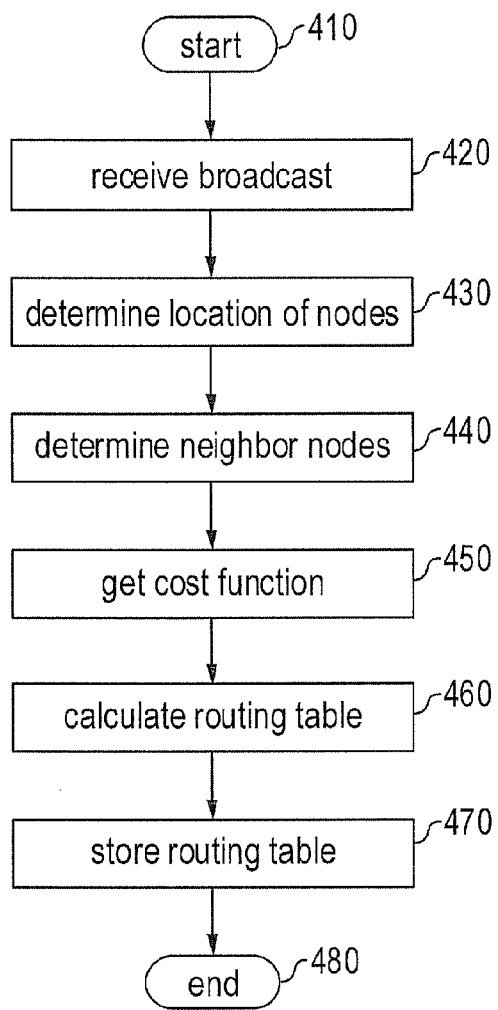
FIG. 4 is a schematic representation of a method of deriving a routing table that may be used when routing a message between nodes in the network of FIG. 1.
Figure 5:
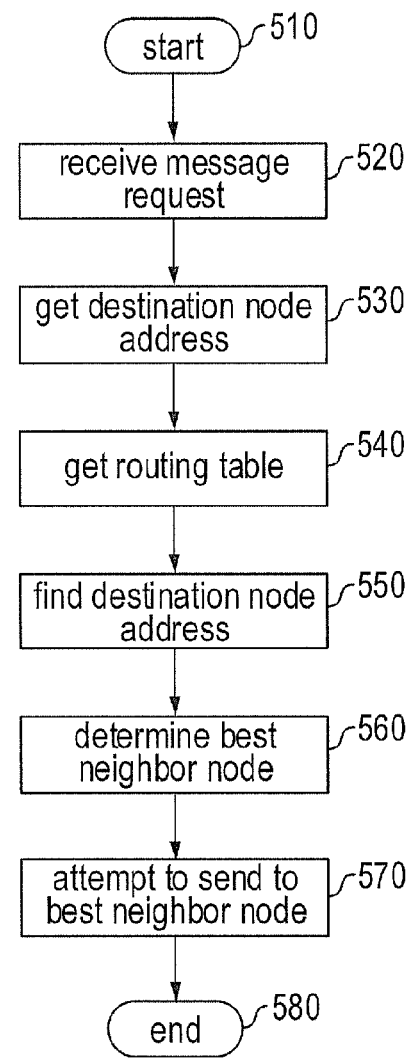
FIG. 5 is a schematic representation of a method of determining a neighbour node to which a message is sent based upon the destination node address of the message.

In order to determine the best neighbour node 101-106, a routing table 224 stored in memory 204 is consulted. This routing table 224 is determined using routing calculations, as will now be described with reference to FIG. 4. How the routing table 224 is subsequently used to determine the best neighbour node 101-106 will be described with reference to FIG. 5. FIGS. 4 and 5 will de described broadly first, with descriptions of finer detail following.

Routing Table Compilation Overview

As mentioned above, network broadcasts 212 are sent by the ground stations 100-101 and satellites 116 that contain information such as a list of the nodes 100-115, the positions of the nodes 100-115, the velocities of the nodes 100-115, the communication ranges of the nodes 100-115 and a time stamp. These network broadcasts 212 may be made periodically, for example every thirty seconds. Source node 102 receives the network broadcasts 212 and this triggers the aircraft communication system 202 to calculate a new routing table 224. Hence, the routing table 224 stored in memory 204 is continually updated.

As shown in FIG. 4, a method of calculating and storing a routing table 224 starts at 410. A network broadcast 212 is received by source node 102, as shown at 420. The network broadcast 212 is passed to the aircraft communication system 202, as shown in FIG. 2.

At 430 in FIG. 4, the aircraft communication system 202 extracts the positions of the nodes 100-115 from the received network broadcast 212, as well as the communication range of each node 100-115. From this information, and from knowledge of its own communication range, the aircraft communication system 202 can determine which nodes 101-106 are in range for direct communication, i.e. the aircraft communication system 202 determines its neighbour nodes 101-106 as shown at 440. This list of neighbour nodes 101-106 is stored in memory 204 as the current neighbour list shown at 221 of FIG. 2.

Calculating the routing table 224 requires calculations to be made to determine the costs of different routes between each neighbour node 101-106 and the other nodes 100-115. Performing such calculations requires a cost function so, at step 450, the cost function 223 to be used is retrieved from memory 204. Further details of the cost function are provided below.

At 460, the cost function 223 is used to calculate the costs of possible routes between nodes 100-115. As will be described in more detail below, a cost calculation is performed for each neighbour node 101-106. This cost calculation is used to determine, for each neighbour node 101-106, the lowest cost for a route to each available destination node (i.e. all other nodes 100-115). Thus, information is derived comprising a list of the neighbour nodes 101-106, with data for each neighbour node 101-106 corresponding to each other node 100-115 (i.e. potential destination nodes) and the lowest cost found to reach each of these potential destination nodes 100-115. Further detail of this step is provided below.

At step 470, this information is stored in the memory 204 as the routing table 224, and so the method ends at 480. An example of a routing table 224, and how the information is ordered, is described below.

Message Forwarding Overview

Before describing some of the steps of FIG. 4 in more detail, a broad description is now given of how the routing table 224 may be used in a method of determining which neighbour node 101-106 is best suited to receive a message.

The method starts at 510, when it is triggered at 520 by receiving a message request to send a message. This send message request may be derived from a request of another system in the aircraft 102 to send a message (i.e. for a new message originating from the aircraft 102), or may be derived internally within the aircraft communication system 202 as a result of an incoming message 210 that is to be forwarded to destination node 114.

At 530, the aircraft communication system 202 obtains the destination node address 114. The address may be contained within the send message request 520, in which case the aircraft communication system 202 may simply extract the address. Alternatively, the aircraft communication system 202 may have to determine the address. For example, the send message request 520 may specify an aircraft's flight number in which case the aircraft communication system 202 may need to translate that to the node address assigned within the ad hoc network 10. This may be done with reference to information stored in the network broadcast 212, e.g. the broadcast 212 may indicate both the current node address and flight code of each node 100-115. Node addressing (and updating of these addresses) in dynamic ad hoc networks is well-known and will not be described further.

With the destination node address 114 determined, the method continues at 540 where the routing table 224 is retrieved from memory 204. At 550, the routing table 224 is accessed and the destination node address 114 is found within the routing table 224. With the destination node 114 found in the table, the associated data is used to determine the best neighbour node 101-106 to receive the message, say neighbour node 105. An attempt to establish a link and to send the message to the best neighbour node 105 is then made at 570, and the method ends as indicated at 580. An alternative to deal with a failed transmission is described later.

Assuming that the message is safely received by neighbour node 105, node 105 repeats the methods described herein with respect to node 102 such that the message is forwarded once more, say to node 109. As each node 100-115 is using the same network broadcasts 212 and the same algorithms, the message is assured to travel the route with the best cost.

Further detail pertaining to the method of calculating the routing table 224 will now be described.

Updates Between Network Broadcast

Figure 6:
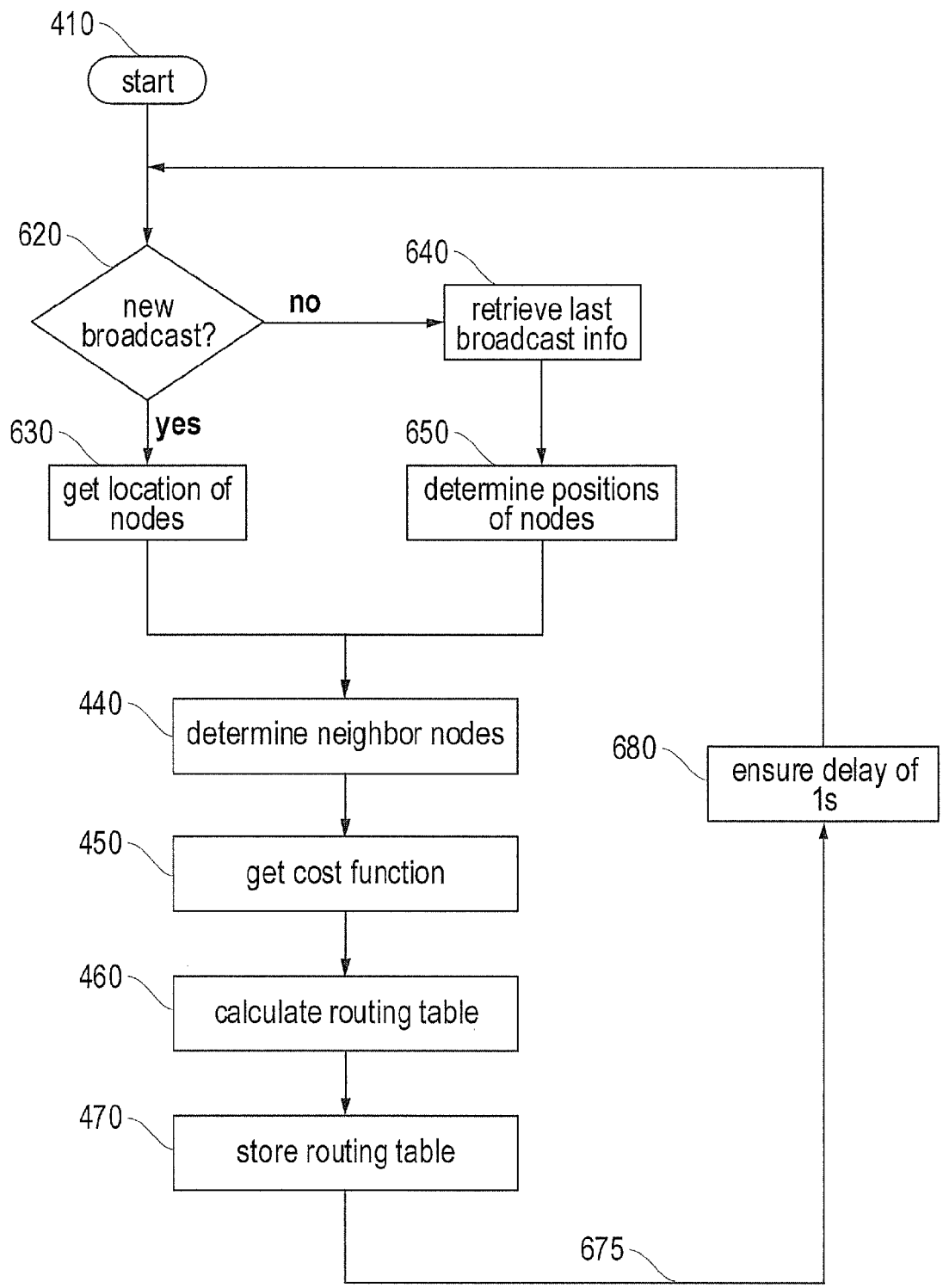
FIG. 6 is a schematic representation adapted from FIG. 4, and is expanded to show how node positions may be interpolated between network broadcasts.

As described above, network broadcasts 212 may be made every 30 seconds. However, it may be desirable to update the routing table 224 more often that this. A method of achieving this is shown in FIG. 6. FIG. 6 broadly corresponds to FIG. 4, and contains the same general steps of determining the nodes 100-115, determining the neighbour nodes 101-106, getting the cost function 223, calculating the routing table 224 and storing the routing table 224 (corresponding steps have corresponding reference numerals). However, in this embodiment, the method of determining the location of the nodes 100-115 is different in FIG. 6 as compared to FIG. 4.

The method of FIG. 6 starts at 410. As indicated at loop 675, the method repeats and introduces a delay of one second thus leading to an update of the routing table 224 approximately every second. Other time intervals such as 5, 10, 30 seconds, for example without limitation, may be implemented to update the routing table with an appropriate selection of the delay in the loop 675. For each iteration of the method, a check is made at 620 to determine whether a new network broadcast 212 has been received since the last iteration. Whether a network broadcast 212 is new or not may be determined by reference to the time stamp it includes. If a new network broadcast 212 has been received, the method continues to step 630 where the location of the nodes 100-115 and the communication ranges of the nodes 100-115 is extracted in the same way as for step 430 in FIG. 4.

If a new network broadcast 212 has not been received, the method continues to step 640 where information from the last network broadcast 212 is retrieved, for example from other data 225 in memory 204. The information retrieved is the location of the nodes 100-115, the velocities of the nodes 100-115, the communication ranges of the nodes 100-115 and the time stamp. A simple calculation is performed at 650 to determine the current position of the nodes 100-115 based on the time stamp, the indicated position of the nodes 100-115, and the indicated velocities of the nodes 100-115, by assuming the velocities to remain constant.

With the location of the nodes 100-115 determined, whether by step 630 or step 650, the method can continue to step 440 where the neighbour nodes 101-106 are determined based on the position and communication ranges of the nodes 100-115, as before. The method then continues as has already been described for FIG. 4, until the updated routing table 224 has been stored at step 470. At that point, the method continues around loop 675 where a delay of one second is ensured at step 680 before returning to step 620 once more.

The Cost Function

As described above, a cost function 223 is stored in memory 204 and is used when calculating the routing table 224 at step 460 of FIG. 4. The cost function 223 is used to calculate the cost of sending a message across a hop between two nodes 100-115, and has contributions to reflect different factors. The cost function 223 is a combination of these factors, with each factor weighted as found optimum. Determining the optimum combination may be performed in any number of ways, for example by intuition or empirical investigation using simulations or the like.

Accordingly, the cost function 233 stored in memory 204 is a reflection of the flexibility in choosing the weighting factors: the stored function 233 will indicate the factors to be included and the relative weighting to be given to each factor. In this embodiment, the factors are as follows.

1. A fixed amount is included for each hop. This is a reflection that routes with fewer hops are better, both in terms of speed and reliability.

2. An amount related to hop distance, as excessively long hops are undesirable due to higher signal-to-noise ratios (that affect bandwidth) and inferior reliability. This contribution is not linear: in this embodiment, the factor remains at zero up to 60% of the total communication range, before increasing linearly up to a maximum value for 95% of maximum range and above.

3. An amount related to the relative speed of the two nodes 100-115 connected by the hop. Thus, the factor increases with relative speed to reflect the greater difficulty in achieving a directional link, the greater compensation and increased bandwidth needed for increasing Doppler shifts, and the potentially shorter duration of the link.

4. An amount inversely proportional to the expected duration of the link between the nodes 100-115. This penalises hops using a link that have short duration, as reliability will be affected by having to switch connections as nodes 100-115 go out of contact. As a simplification, this factor may be combined with 3 above as the duration is often, but not necessarily, reliant on relative speeds.

5. A contribution may be provided according to the distance to a hole border. As described above, the mesh of nodes 100-115 may contain holes 30 devoid of nodes 100-115. The nodes 100-115 that lie on the border of the hole 30 see a high volume of traffic, so it is good to increase the cost associated with such "hot-spots". A contribution is made that is inversely proportional to the product of the distance to the hole border and the size of the hole 30. The distance to the border may be determined as the shortest distance from the mid-point of the hop to the hole border.

The cost function 223 may be tuned by adjusting the factors taken into consideration, and the relative weighting of each. The above factors are merely provided as examples, and any combination of them may be used, including other factors not mentioned above.

Calculating the Routing Table

Step 460 in FIG. 4 corresponds to calculating the routing table 224, and will now be described in greater detail with reference to FIG. 7a. The method essentially comprises calculating the cost of routes between each neighbour node 101-106 and all the other nodes 100-115. This is implemented using two loops; an outer loop indicated by return path 715, and an inner loop indicated by return path 725. The outer loop 715 ensures the calculations are repeated for each neighbour node 101-106. The inner loop 725 ensures that the calculations are repeated for each possible destination node 100-115 during the consideration of any particular neighbour node 101-106.

Figure 7A:
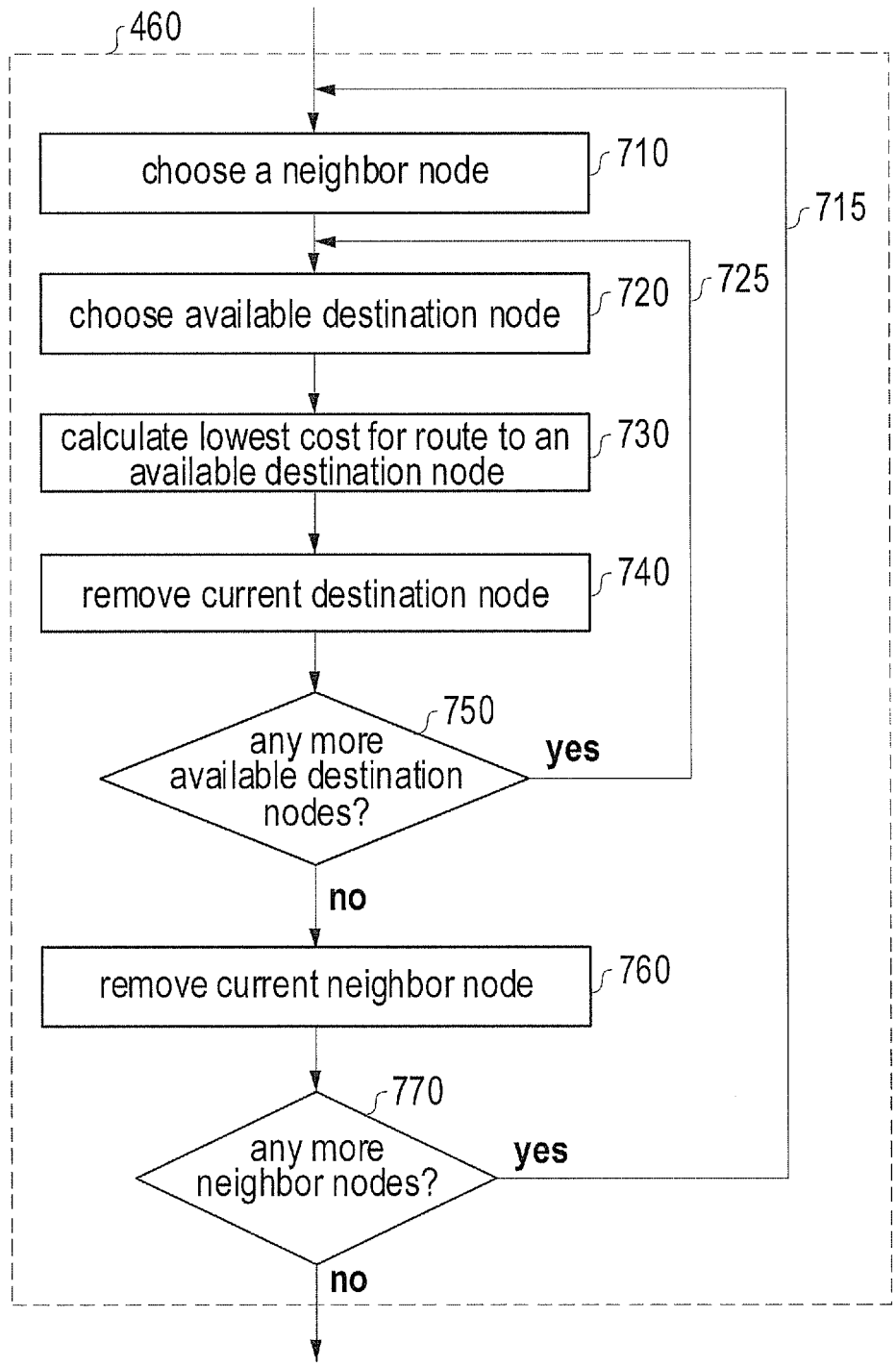
FIGS. 7a and 7b are schematic representations of two methods that show the calculate routing table step of FIG. 4 in greater detail.

The method of FIG. 7a starts at 710, the head of the outer loop 715, where the first neighbour node 101-106 is chosen. The method progresses to step 720, the head of the inner loop 725, where an available destination node 100-115 is chosen. With a destination node chosen, the method progresses to step 730 where a determination of the lowest cost to route a message from the current neighbour node 101-106 to the current destination node 100-115 is made. This determination uses the cost function 223 to determine the cost of routes from the current neighbour node 101-106 to the current destination node 100-115. To determine the lowest cost route, the cost of all possible routes may be calculated or a targeted approach to finding the lowest cost route may be used. Although routing details of the lowest cost route may be recorded, they are not. Instead, only the cost of this route is retained.

Once the lowest cost for a route has been found at 730, the current destination node 100-115 is removed from the list of possibilities at step 740, and the method progresses to step 750 where a check is made to see if there are any further available destination nodes 100-115 to process. If there are, the method loops back to step 720 via inner-loop return path 725. At step 720, another available destination node 100-115 is chosen, and the lowest cost of a route between the current neighbour node 101-106 and this new destination node 100-115 is found. The inner loop 725 iterates in this way until the lowest costs have been determined between the current neighbour node 101-106 and all available destination nodes 100-115.

The inner loop 725 is left when the determination at step 750 indicates that there are no more destination nodes 100-115 to process. In this case, the method continues to step 760 where the current neighbour node 101-106 is removed from the list of neighbour nodes 101-106 to be processed at step 710 (although it is still considered when calculating the possible destination nodes). A check of the list is made at 770 to determine whether there are further neighbour nodes 101-106 to process. If yes, the outer loop 715 is followed such that the method returns to step 710 where a new neighbour node 101-106 is chosen. The method then enters the inner loop 725 once more to calculate the lowest costs for routes between the new neighbour node 101-106 and each available destination node 100-115. Thus, the outer loop 715 sees the calculations performed for each neighbour node 101-106 in turn.

The outer loop 715 is left when the determination at step 770 indicates that no neighbour nodes 101-106 remain to be processed. The calculations are then complete so that the overall method may continue to step 470 of FIG. 4 where the information found from the calculations is stored in the routing table 224.

Essentially, the routing calculations performed in step 460 provide a list of neighbour nodes 101-106 and, for each neighbour node 101-106, the available destination nodes 100-115 and the lowest cost of the best route between that neighbour node 101-106 and destination node 100-115. This information is stored in as efficient a manner as possible for subsequent use in determining the best neighbour node 101-106 to receive a message addressed to any destination node 100-115.

Figure 7B:
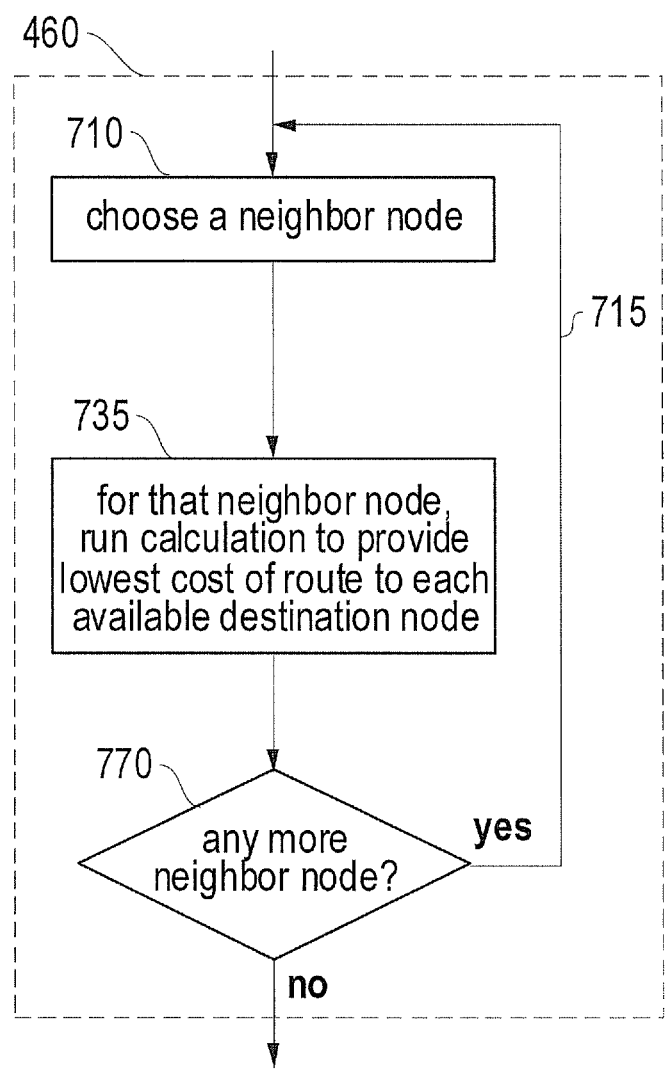

An alternative method is shown in FIG. 7b. As the method of FIG. 7b broadly corresponds to that of FIG. 7a, like reference numerals are used for like parts and the following description is limited to highlighting the differences between the two methods.

The method of FIG. 7b comprises only a single loop 715, this corresponding to the inner loop 715 of FIG. 7a. This loop 715 ensures that calculations are performed for each neighbour node 101-106 in turn. However, an inner loop 725 is not present as the calculation of lowest cost at 730 of FIG. 7a is not repeated in turn for each available destination node 101-115. Instead, a single calculation such as a modified Dijkstra algorithm is used at 735 to calculate the cost of reaching every possible destination node 101-115. This produces the best cost for routes between the neighbour node chosen at 710 and every destination node 101-115.

The method progresses to step 770 where a check is made to see if further neighbour nodes 101-106 require processing at step 710. If there are, the loop repeats at 715 such that the calculation at step 735 is performed for the next neighbour node 101-106. When all neighbour nodes 101-106 have been processed, the question at step 770 results in an answer of no and the method continues as indicated in FIG. 7b.

Routing Table

An example of a routing table 224 is shown in FIG. 8. It will be appreciated that the aircraft communication system 202 may manage the storage of the data as a computer-readable file in a format broadly corresponding to the structure of the data shown in FIG. 8.

The first column of the table 224 provides an ordered list of destination node addresses. Thus, each row corresponds to a destination node address, the first entry indicating the destination node address, with successive entries representing the neighbour nodes 101-106 and their lowest costs, presented in order with the neighbour node 101-106 having the best cost first, the next best neighbour node 101-106 presented second, and so on. Hence, at step 560 of FIG. 5, a determination of the best neighbour node 101-106 may be made by finding the destination node address within the routing table 224 and reading the associated best neighbour node address.

The routing table 224 shown in FIG. 8 records the actual cost for each neighbour node 101-106 for that destination node address, as this is used when maintaining active and inactive links to neighbour nodes 101-106 as will be described below.

An ordered list of neighbour nodes 101-106 may be provided in the routing table 224 in case transmission to the best neighbour node 101-106 is unsuccessful. By providing the list, an attempt may be made to send a message to the next best neighbour node 101-106 and so on until a successful transmission is made. This is shown in more detail in FIG. 9. It may also be used where the best neighbour node 101-106 has an inactive link, in which case successive entries may be consulted until the first neighbour node 101-106 with an active link is found.

Failed Message Transmission

Figure 9:
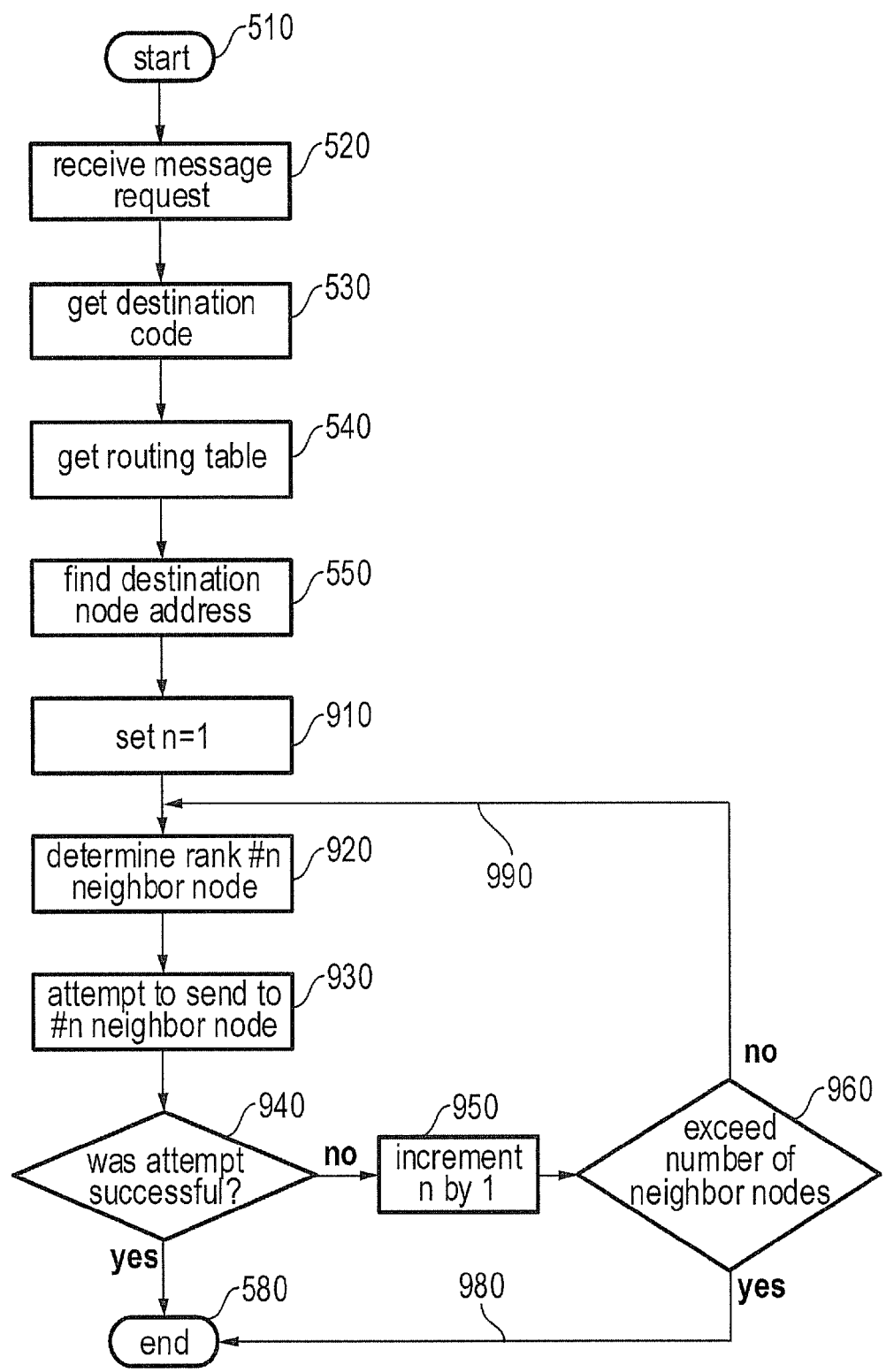
FIG. 9 is a schematic representation of a method adapted from FIG. 5, and is expanded to illustrate how unsuccessful transmissions to a selected neighbour node may be accommodated.

FIG. 9 corresponds largely to FIG. 5, and starts in the same way by receiving a message request at 520, getting the destination node address at 530, getting the routing table 224 at 540 and finding the destination node address in the routing table 224 at step 550.

The method then proceeds to step 910 where an integer n is set to 1. The $n^{th}$ best neighbour node 101-106 (i.e. the neighbour node 101-106 with the $n^{th}$ lowest score) is determined. In this first iteration, the best neighbour node 101-106 is found. An attempt to send the message to the $n^{th}$ best neighbour node 101-106 is made at 930. At 940, a determination is made as to whether the message was delivered successfully (e.g. using an acknowledgement or any other well known method). If the message was successfully delivered, the method ends at 580.

If delivery of the message was not successful at step 940, the method continues to step 950 where n is incremented by 1. At step 960, a check is made to ensure that n has not exceeded the total number of neighbour nodes 101-106. If n does exceed this number, this indicates that all neighbour nodes 101-106 have been tried without success. In this embodiment, the method proceeds along 980 to end, i.e. no more attempts are made to send the message. Alternatively, n may be reset to 1 so that continues attempts to deliver the message are made.

Assuming that n does not exceed the total number of neighbour nodes 101-106, the method returns to steps 920, 930 and 940 where the next best neighbour node 101-106 is determined and an attempt to send the message to that node 101-106 is made. Another unsuccessful attempt will cause the method to loop once more with n being incremented one higher. Thus, attempts are made to send the message as many times as necessary until all neighbour nodes 101-106 have been tried, with the neighbour nodes 101-106 being tried in increasing order of cost. For messages being forwarded, the node that sent the message to what is now the source node may be excluded as a potential neighbour node.

Overview of Active/Inactive Link Configurations

As noted above, the methods above were described in the context of the source node 102 establishing a link with a neighbour node 101-106 each time a message is to be sent. Where volumes of data traffic are high, it may be more efficient to establish and then maintain links with neighbour nodes 101-106, such that the links are in place ready for whenever a message is to be sent. Links may be established and maintained with all available neighbour nodes 101-106. However, in this embodiment, links are established to a subset of the available neighbour nodes 101-106. Hence, at any one time, a configuration of active links will exist.

The dynamic nature of the ad hoc network 10 means that the active links will need to be reconfigured from time to time, and embodiments of the present invention is directed to maintain these links through such reconfigurations. For each configuration, a balance will need to be struck between the desire to minimise the number of active links to reduce computing overheads and ensure availability of links to other nodes, while maintaining enough active links to allow messages to be delivered (in a reasonably efficient manner or, in worst cases, at all).

The following description is directed to embodiments that include this function of maintaining configurations of active and inactive links. It should be apparent how the descriptions above may be adjusted to accommodate this function. Indeed, explicit mentions have been made of possible adaptations, for example reading along the row of the routing table 224 to find the best neighbour node 101-106 with an active link.

Figure 10:
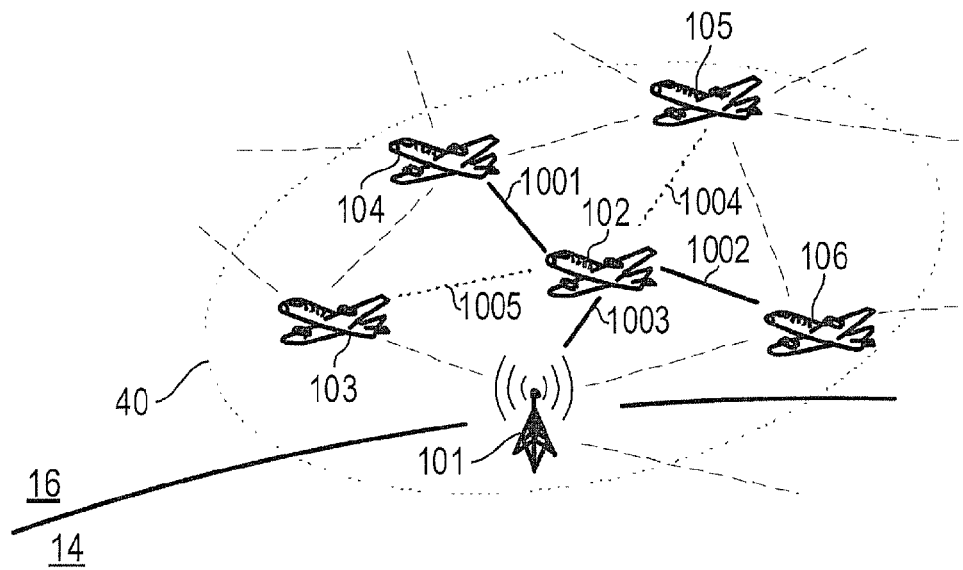
FIG. 10 is a schematic representation adapted from FIG. 1 and shows how a source node may form active and inactive links to its neighbour nodes for a particular configuration in an embodiment of the invention.

FIG. 10 is a detail from FIG. 1 and shows source node 102 with its neighbour nodes 101-106. Active links 1001-1003, shown in solid lines, are established and maintained between the source node 102 and neighbour nodes 101, 103 and 105. Links 1004-1005 between the source node 102 and neighbour nodes 103 and 105 are inactive and shown in dashed lines.

Figure 11:
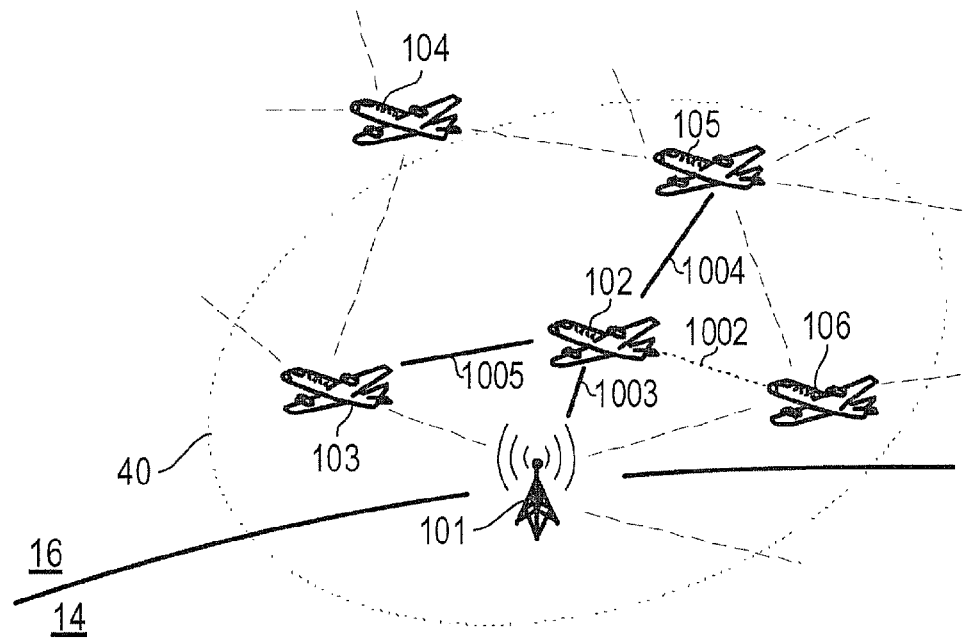
FIG. 11 corresponds to FIG. 10 and shows a new configuration of active and inactive links found as a result of a neighbour node moving out of range for direct communication in an embodiment of the invention.

FIG. 11 corresponds to FIG. 10, but is a snapshot of the ad hoc network 10 taken a short while later. The relative positions of the nodes 101-106 have changed. Moreover, node 104 has moved out of range for direct communication with source node 102. As a result, the active links have been reconfigured such that link 1004 to node 105, link 1003 to node 101 and link 1005 to node 103 are now active. Link 1002 to node 106 has been dropped to become inactive. How the reconfiguration is performed according to one embodiment of the invention will now be described.

Points Scoring for the Network

In general, the configuration of the links 1001-1005 is determined based upon the amount of traffic that each neighbour node 101-106 sees. In particular, points are assigned to each message, and these points are shared between the neighbour nodes 101-106 according to their lowest cost to send the message to its destination node 100-115. The points are also used to contribute to an overall actual configuration value (ACV). The score attached to each neighbour node 101-106 is a reflection of how good it is in routing all messages, whether or not it is used to receive that message. The ACV reflects the goodness of the configuration based upon the cost of only the neighbour node 101-106 that receives each message. The neighbour node points and the ACV are used to determine how the links should be reconfigured.

Figure 12:
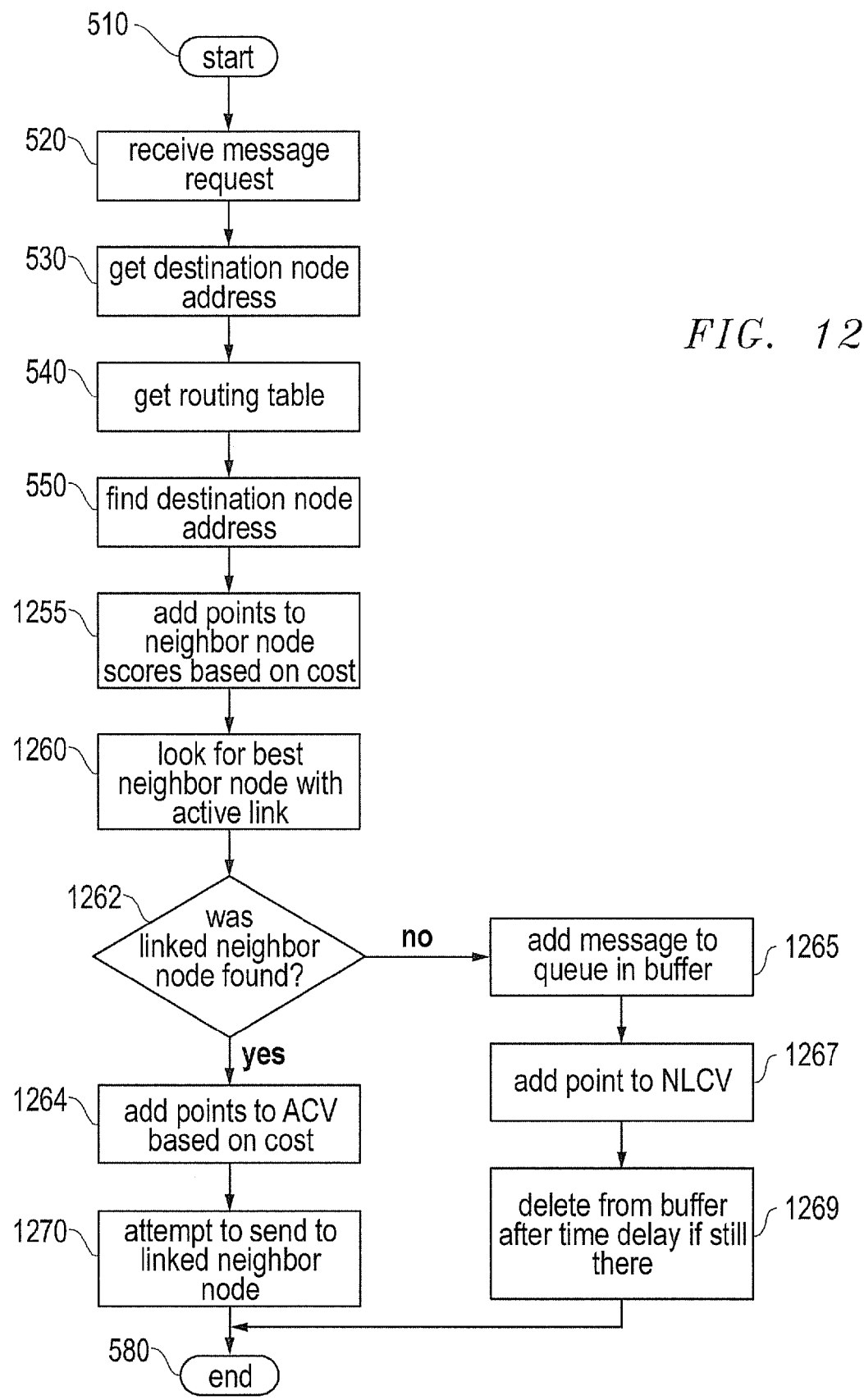
FIG. 12 is a schematic representation of a method adapted from FIG. 5, and is expanded to illustrate how points may be assigned when sending a message to reflect the goodness of individual neighbour nodes and the overall link configuration in an embodiment of the invention.

FIG. 12 is adapted from FIG. 5, and shows how points are assigned when a message is sent. The start of the method is essentially the same as described for FIG. 5. Hence, the method starts at 510 due to receipt of a message request at 520. The destination node address is found at 530, and the routing table 224 is obtained at 540.

With the routing table 224 retrieved, the destination node address is found and the associated data accessed. As was explained above, the routing table 224 may contain a list of the neighbour nodes 101-106 and the lowest cost of sending a message to that destination node 100-115. A total points value is determined that may be proportional to the priority of the message (with the highest priority receiving the most points). These points are then shared between the neighbour nodes 101-106. Each neighbour node 101-106 has a neighbour node score, and points are assigned to each neighbour node score on a pro rata basis depending on the lowest cost given for that neighbour node 101-106. The lower the cost, the more points received. This step is shown at 1255 in FIG. 12. Thus, each neighbour node has a score that may receive points (pro rata) for each message sent. The score may also receive points from incoming messages, i.e. the source node 102 determines the origin of a received message and credits points to the neighbour nodes 101-106 accordingly. To make the scores current, each neighbour node's score may be decreased over time. According to this embodiment, each neighbour node's score is decreased at a rate proportional to the cost of the link to the source node 102. Hence, neighbour nodes 101-106 with a high-cost link to the source node 102 have their scores eroded more quickly.

In addition, at step 1260, the routing table 224 is used to determine the best neighbour node 101-106 to which a link 1001-1005 is established. For example, the neighbour nodes 1010-106 may be read from the ordered list presented by the routing table 224 in turn until a neighbour node 101-106 with an established link is found.

At 1262, a check is made to ensure a linked neighbour node 101-106 was found. Where a linked neighbour node 101-106 is found, two further steps are performed.

First, at 1264, points are added to the ACV based upon the cost recorded for the linked neighbour node 101-106 to send the message to its destination node 114, as already determined from the routing table 224. The points given to the ACV are also scaled to be proportional to the priority of the message (with the highest priority receiving the most points). The ACV represents a snapshot of the configuration and contains points assigned during a prior time interval, for example, the last five seconds only.

Second, at 1270, an attempt to send the message to the linked neighbour node 101-106 is made and the method then ends. As a link is already established, it should be possible to send the message even if more than one attempt is required.

In some circumstances, it may be that the only routes that link the source node 102 to the destination node 114 go via neighbour nodes 101-106 with inactive links. In these circumstances, the determination at 1262 will be negative and so the message is added to a buffer at 1265. At 1267, points are added to a no link cost vector (NLCV). The NLCV retains the neighbour node scores that would be derived from the contributions of the messages currently in the buffer, and the sum of these scores gives an overall NLCV value. The method proceeds to step 1269 where, after a predetermined time delay, the message is deleted from the buffer if it is still there. The buffer is checked whenever a link reconfiguration occurs, and a message will leave the buffer if a link is created allowing delivery of the message. However, when a message leaves the buffer, its points contributions to the NLCV are subtracted. Thus, the NLCV overall value remains current as it reflects only the messages currently held in the buffer. The method then ends at 580.

Reconfiguration Due to Loss of Neighbour Node

Figure 13:
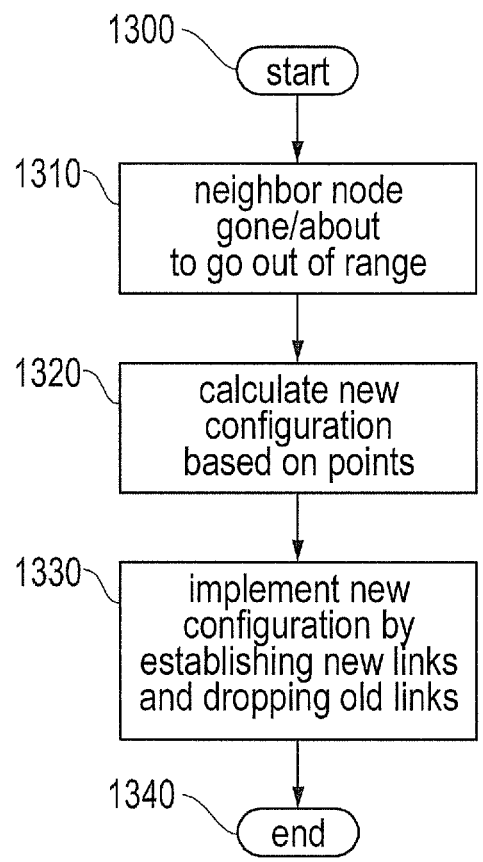
FIG. 13 is a schematic representation of a method of maintaining links in an ad hoc network in an embodiment of the invention.

FIG. 13 shows an embodiment of a method for maintaining a configuration of active and inactive links according to a first, general embodiment as performed by each node 100-115 of the ad hoc network 10. In this example, node 102 is again taken as our subject (i.e. the source node).

The method starts at 1300, and is triggered either by a neighbour node 101-106 going out of direct communication range or by detecting that a neighbour node 101-106 is about to go out of range. It will be appreciated that it is straightforward to determine either of these events, so no further detail will be given here. An assessment of the future positions of neighbour nodes 101-106 (e.g. using current position and velocity) is not the only available method for predicting when a neighbour node 101-106 is about to go out of range for direct communication. An alternative is to monitor the signal to noise ratios of messages sent to/received from a neighbour node, with deteriorating signal to noise ratios indicating that a neighbour node 101-106 is about to go out of range. A predictive implementation that determines when neighbour nodes 101-106 is preferred for obvious reasons.

The method continues to step 1320 where a new configuration of links is calculated that is based on points assigned to neighbour node scores according to the amount of data traffic that they see. The points assigned to each neighbour node may be determined by the aircraft communication system 202 of the source node 102, and may or may not be as described immediately above. For example, a fixed amount of points may be assigned to a neighbour node 101-106 when a message is sent to that neighbour node 101-106. Rather than a fixed amount, a variable amount may be given in proportion to the priority of the message. The aircraft communication system 202 may also assign points when messages are received, i.e. points may be assigned to the neighbour node 101-106 that forwarded the message to the source node 102. Preferably, a symmetric point scheme is used that sees incoming and outgoing messages treated equally, i.e. the points assigned to an incoming message correspond to the points given to an identical outgoing message.

Links will be formed preferably to neighbour nodes 101-106 that have high points scores, and links may be dropped to neighbour nodes 101-106 with low points scores, such that the new configuration corresponds to an optimum. The new configuration is then implemented at 1330 by establishing the required new links and dropping the no-longer required old links, and the method then ends at 1340. Determining the optimum configuration may comprise scoring different potential configurations and choosing the configuration with the best score.

Other Triggers for Reconfiguration

A second, more detailed embodiment of a method of maintaining a configuration of active and inactive links will now be described with reference to FIG. 14. In this embodiment, three events are used to trigger a reconfiguration. In summary, these triggers are a neighbour node going out of range/about to go out of range, a score of a neighbour node dropping below a threshold thereby indicating it is performing poorly, and the buffer becoming too full thereby indicating that the current configuration is causing too many messages to become undeliverable. There are many other possibilities, including any combination of the above.

FIG. 14 shows one iteration of the method, although the method repeats regularly. Specifically, the method runs for each update of the node positions, i.e. once every second according to the embodiment described above with reference to FIG. 6. This method may be triggered after step 480 of FIG. 4 or step 470 of FIG. 6.

Thus, at 1400 the method starts when the aircraft communication system 202 has stored the latest routing table 224 as indicated at 1405. This causes a new routine to start, as shown in FIG. 14. The routine may be stored in the memory 204, for example as shown at 226 in FIG. 2.

At 1410, a check is made to see if any neighbour nodes 101-106 have gone out of range for direct communication. In addition, the position of each neighbour node 101-106 at a future time, for example in ten seconds time, is calculated using the position and velocity information of each neighbour node 101-106 received in the latest network broadcast 212. This calculation is used to determine whether any neighbour node 101-106 will go out of range for direct communication in the next ten seconds.

If the determination indicates that no neighbour nodes 101-106 are either out of range or about to go out of range, the method may proceed via path 1418 to the next block where a check is made to see whether a reconfiguration may be necessary. Alternatively, if one or more neighbour nodes 101-106 are either out or range or about to go out of range, the method continues through steps 1411 to 1415.

For the first neighbour node 101-106 either out of range or going out of range, step 1411 sees a calculation made on the basis of a potential configuration. All neighbour nodes 101-106 out/going out of range are removed from the current configuration, and an inactive link to a neighbour node 101-106 is selected and then considered to be active. The calculation then uses the messages sent in a prior time interval, for example the last five seconds, to calculate the ACV that would result from sending these messages with the potential configuration, including the new link that is being considered as active. This calculation requires reference to a log of messages and the routing tables 224 for the last five seconds. To allow this, the memory 204 may store a log of the messages for the last five seconds or other time interval as configured, for example as indicated by other data 225 in FIG. 2. For example, a record may be kept for each possible destination node of messages sent to that node during the prior period. Each time a message is sent, this is added to the record of the destination node (along with an indication of priority if weighted point scoring is used). Old messages are deleted from the records after their age exceeds the length of the prior period. The points of the overall configuration value may be calculated from these records. In addition, the routing tables 224 may be stored in the memory 204, such as in a first-in first-out buffer that keeps a five second window of routing tables 224. At 1412, the ACV that is calculated in this way is then stored, for example in memory 204.

As shown by loop 1413, the calculations performed at steps 1411 and 1412 are repeated for all potential configurations, i.e. by creating a number of potential configurations, each with a different inactive link treated as being active. The modified ACVs for these potential configurations are compared and the one with the best ACV is chosen.

At 1414, an attempt is made to create an active link to the neighbour node identified in the best potential configuration. A check is made at 1415 as to whether the link is now active. If it is, the method continues via path 1417 to step 1420. If the link failed, at 1416 the method tries the next best neighbour node, and so on until a link is established or no further neighbour nodes remain. The method continues via path 1417 to step 1420.

At step 1420, the second block in the method starts when the next check is made to determine whether a reconfiguration is required. At this step, the neighbour node scores are checked to see if any have fallen below a threshold, thereby indicating that one or more neighbour nodes 101-106 are performing poorly. This threshold may be the same for all neighbour nodes 101-106, or may vary. If all neighbour node scores are above the threshold, the method may continue along path 1428 to the third block where the buffer is checked. Otherwise, the method continues to step 1421 where the removal of poorly-performing nodes is considered.

At step 1421, a potential configuration is made by removing a neighbour node 101-106 with a score below the threshold. As for step 1411, the ACV of this potential configuration is calculated at step 1422 based on the messages sent in the last five seconds in this example. At 1423, a determination is made as to whether the ACV of the potential configuration without the poorly performing neighbour node 101-106 is significantly lower: if it is, a decision is made to keep the link active; if the difference in ACV is not significantly reduced, the link to the poorly performing neighbour node 101-106 may be made inactive.

As shown at loop 1426, steps 1421-1423 are repeated for each poorly-performing neighbour node 101-106. In this way, a check is made to see how a configuration without each poorly-performing neighbour node 101-106 would score and, if there is little difference, that node 101-106 may be dropped. When all poorly-performing neighbour nodes 101-106 have been checked in this way, the method continues along path 1427 to the third block at step 1430.

The third and final block starts at 1430 when a check is made on the buffer containing undeliverable messages. As mentioned above, some messages may prove undeliverable, not because there is no route to the destination node, but because all the possible routes go via neighbour nodes 101-106 that have inactive links. These messages are sent to the buffer. The number of messages in the buffer thus becomes a measure of the utility of the present configuration, hence so too does the overall value of the NLCV. So, at 1430, a check of the NLCV overall value is made to see whether a reconfiguration is required. If this check shows that the present configuration is acceptable such that the NLCV overall value is less than a threshold, the method ends at 1440, as shown via path 1438 in FIG. 14.

If the NLCV overall value exceeds the threshold, the method proceeds to step 1431 where ACVs are calculated for all potential configurations. Each potential configuration is made by considering an inactive link to one of the neighbour nodes 101-106 to be active, and calculating the ACV based on the messages sent, for example in the last five seconds, including the points kept in the NLCV in respect of the messages stored in the buffer. At 1432, the ACV that is calculated in this way is then stored, for example in memory 204. Loop 1433 sees these calculations repeated for all potential configurations.

The potential configuration with the best ACV is then chosen and, at step 1434, an attempt is made to make the link to the corresponding neighbour node 101-106 active. If this fails, as determined at 1435, the next best neighbour node 101-106 is tried and so on. The method then ends at 1440, ready to restart at step 1405 whenever the node positions are next calculated.

As mentioned above, whenever the links are reconfigured, the buffer is checked and any messages that are now deliverable are removed from the buffer and sent.

Those skilled in the art will appreciate that changes may be made to the embodiments described above without necessarily departing form the scope of the present invention, as defined by the appended claims.

For example, the ad hoc network 10 has been described in the context of aircraft. The network 10 may comprise solely aircraft, or a mixture of aircraft and other types of nodes. Candidates for nodes include ground stations, satellites, and other vehicles whether they be land, sea or air vehicles. In its broadest sense, embodiments of the present invention need not include aircraft but could include any of the other types mentioned above (and any combination thereof), such as automobiles. Many different types of aircraft would also be suitable, including rotorcraft and aeroplanes, manned or unmanned.

Although specific examples of cost functions are provided, it will be appreciated that other forms of the cost function may be used. Likewise, many choices exist for the cost algorithm used.

The triggers that cause a reconfiguration may also be varied from what has been described above.

Aircraft may act as a node whenever in service, either when airborne or on the ground. Alternatively, their use as a node may be restricted, for example to only when airborne or even only when cruising (i.e. the aircraft may not act as a node in any of the take-off, climb-out, descent, approach and landing phases).

The invention claimed is:

1. A method of maintaining data links to and from a source node in an ad hoc mobile network, wherein the network comprises nodes including neighbor nodes corresponding to nodes within range for direct communication with the source node, the neighbor nodes comprising active neighbor nodes and inactive neighbor nodes, the active neighbor nodes being connected to the source node via respective active data links and the inactive neighbor nodes having respective inactive data links to the source node, the active and inactive data links foaming an existing configuration of data links, the method comprising:
    identifying one or more lost neighbor nodes corresponding to neighbor nodes of the existing configuration that are about to move out of range for direct communication;
    determining revised configurations of data links in which any active links to lost neighbor nodes are considered inactive and, for at least one revised configuration, an inactive link is considered active and/or a further active link is considered inactive;
    determining an overall configuration value for each revised configuration based at least partly on the cost of sending messages from the source node using the revised configuration of data links;
    selecting a new configuration of data links from the revised configurations according to the overall configuration values determined; and
    forming the new configuration of data links by breaking data links with neighbor nodes that are active on the existing configuration list but inactive on the new configuration list, and forming data links with any neighbor nodes that are inactive on the existing configuration list and active on the new configuration list.

2. The method of claim 1, further comprising identifying new neighbor nodes that have moved into range for direct communication with the source node or are about to move into range for direct communication, and wherein determining the revised configurations of data links includes determining at least one revised configuration in which an active link to a new neighbor node is considered.

3. The method of claim 1, wherein determining the revised configurations of data links comprises determining a revised configuration in which any active data links to lost neighbor nodes are considered inactive and no further links are changed from active to inactive or vice versa, and a further revised configuration is determined for each inactive link in which that inactive link is considered active and any active data links to lost neighbor nodes are considered inactive.

4. The method of claim 1, wherein determining the revised configurations of data links comprises determining at least one revised configuration in which two or more inactive links are considered to be active.

5. The method of claim 1, wherein determining the overall configuration value for each revised configuration comprises determining the best cost of sending messages from the source node to their respective destination nodes, and attributing points to the overall configuration value in accordance with the best costs.

6. The method of claim 5, wherein determining the overall configuration value for each revised configuration comprises attributing points to the overall configuration value by considering the messages sent by the source node during a prior period.

7. The method of claim 1, wherein if a message cannot be sent from the source node because a required neighbor node is an inactive neighbor node, the method further comprises:
   determining revised configurations of data links in which an inactive link is considered active and/or an active link is considered inactive;
   determining an overall configuration value for each revised configuration based at least partly on the cost of sending messages from the source node using the revised configuration of data links;
   selecting a new configuration of data links from the revised configurations according to the overall configuration values determined; and
   forming the new configuration of data links by breaking data links with neighbor nodes that are active on the existing configuration list but inactive on the new configuration list, and forming data links with any neighbor nodes that are inactive on the existing configuration list and active on the new configuration list.

8. The method of claim 7, wherein determining the revised configurations of data links comprises determining a revised configuration of data links in which the inactive link to the required neighbor node is considered active.

9. The method of claim 1, wherein if a message cannot be sent from the source node because a required neighbor node is an inactive neighbor node, the method further comprises:
   putting the message into a queue and increasing a queue score;
   determining when the queue score exceeds a threshold, and when the threshold is exceeded;
   determining revised configurations of data links in which an inactive link is considered active and/or an active link is considered inactive;
   determining an overall configuration value for each revised configuration based at least partly on the cost of sending messages from the source node using the revised configuration of data links;
   selecting a new configuration of data links from the revised configurations according to the overall configuration values determined; and
   forming the new configuration of data links by breaking data links with neighbor nodes that are active on the existing configuration list but inactive on the new configuration list, and forming data links with any neighbor nodes that are inactive on the existing configuration list and active on the new configuration list.

10. The method of claim 9, further comprising determining whether any of the messages currently stored in the queue may be sent as a required inactive neighbor node is now an active neighbor node according to the new configuration, and sending any such queued messages, and decreasing the queue score whenever a queued message is sent.

11. The method of claim 1, wherein each neighbor node has an associated neighbor node score, the method further comprising assigning points to neighbor node scores according to the traffic that neighbor node sees.

12. The method of claim 11, wherein if a neighbor node score falls below a threshold, the method further comprises:
   determining revised configurations of data links in which an inactive link is considered active and/or an active link is considered inactive;
   determining an overall configuration value for each revised configuration based at least partly on the cost of sending messages from the source node using the revised configuration of data links;
   selecting a new configuration of data links from the revised configurations according to the overall configuration values determined; and
   forming the new configuration of data links by breaking data links with neighbor nodes that are active on the existing configuration list but inactive on the new configuration list, and forming data links with any neighbor nodes that are inactive on the existing configuration list and active on the new configuration list.

13. The method of claim 11, further comprising assigning points to the neighbor node scores for each message sent according to the cost of sending that message through that neighbor node.

* * * * *